United States Patent Office 2,813,099
Patented Nov. 12, 1957

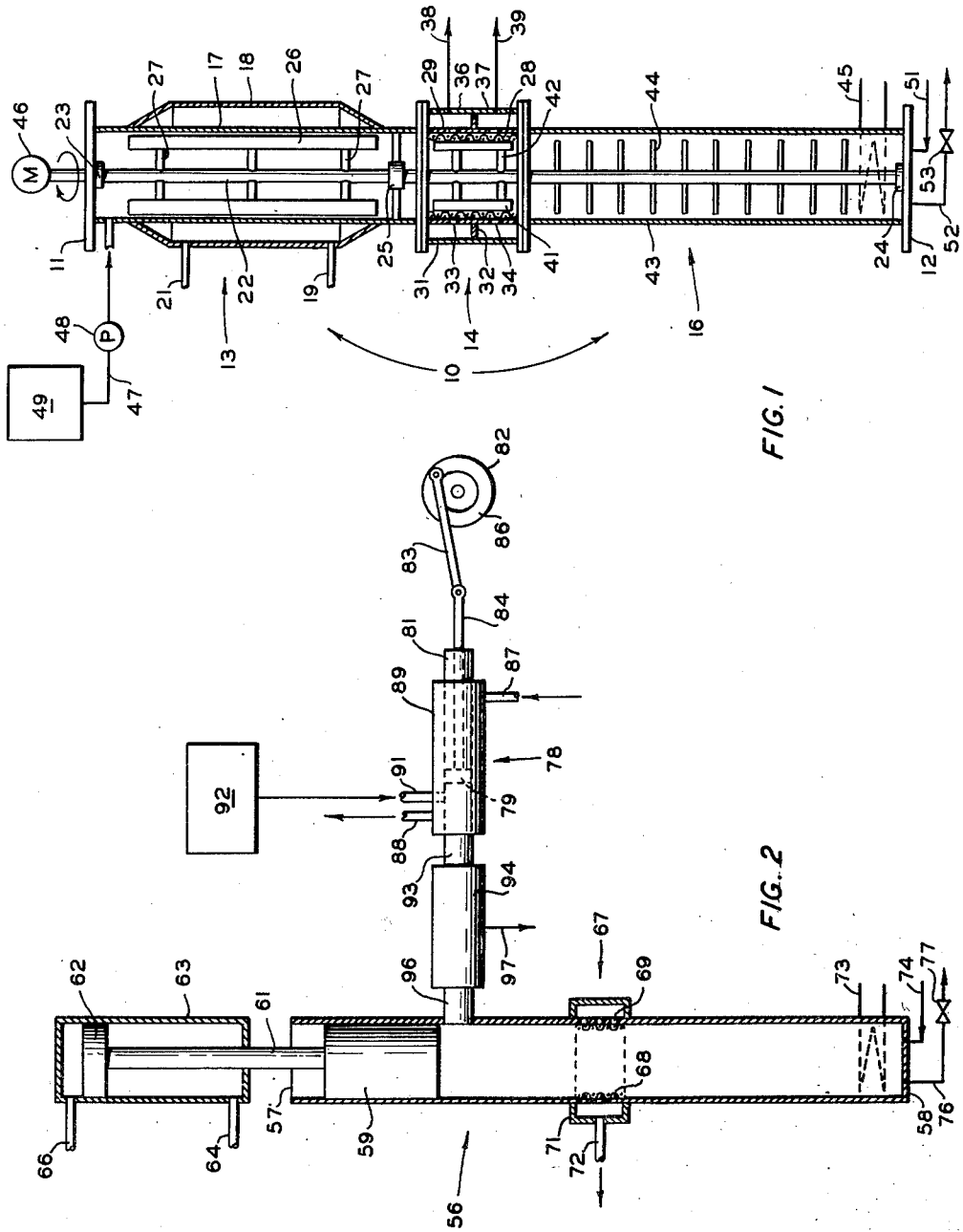

2,813,099

CRYSTAL PURIFICATION PROCESS

John A. Weedman, Bartlesville, Okla., assignor to Phillips Petroleum Company, a corporation of Delaware Application November 16, 1953, Serial No. 392,279

17 Claims. (Cl. 260—290)

This invention relates to the separation and purification of components of liquid multi-component mixtures. In a more specific aspect, it relates to the separation of the components of a liquid mixture according to their freezing points. In one of its more specific aspects, it relates to the separation and purification of a hydrocarbon from a mixture containing other hydrocarbons. In still another of its more specific aspects, it relates to a process for the separation and purification of materials which form soft waxy type crystals. In yet another of its more specific aspects, it relates to a process which utilizes a low boiling liquid solvent to aid the natural reflux liquid in removing occluded impurities from crystals.

In the separation of liquid multi-component mixtures by crystallization methods, it is theoretically possible to obtain at least one of the components in substantially pure form in a single stage of operation. Accordingly, while distillation and solvent extraction methods of separation in theory would require infinite stages for a pure product, only one stage of crystallization should be required since crystals separating from a solution are presumed to have a definite composition. In actual practice, however, it has been found that the crystals obtained from a solution of several components are impure because of the occlusion of mother liquor within the crystal interstices.

The amount of mother liquor occluded or entrapped by the crystals formed in a crystallization process is ordinarily so great that it is necessary to provide some method for the removal of the occluded impurities if a high purity product is to be obtained in a single crystallization stage. In my copending U. S. application, Serial No. 166,992, filed June 9, 1950, now Patent No. 2,747,001, I have disclosed a continuous method for the separation and purification of liquid multi-component mixtures which utilizes a displaced reflux liquid to wash impurities from the crystals in order to obtain a high purity product. This method involves cooling a liquid multi-component mixture from which the separation is to be made so as to form crystals of at least the high melting component and thereafter separating the crystals from the mother liquor. The crystals are then introduced into a purification zone, in one end of which a melting zone is maintained, and moved as a uniform, compact mass into the melting zone where the crystals are melted. A portion of the melt is withdrawn as product while at least a part of the melt is displaced countercurrently to the movement of crystals and in intimate contact therewith so as to remove the occluded impurities. I have found that it may be advantageous and desirable to introduce a light liquid solvent into the melting zone of the purification zone in order to lower the viscosity and density of the liquid phase when effecting the separation of materials which form soft waxy type crystals.

The objects of this invention will be attained by the various aspects of the invention.

It is an object of the present invention to provide a process and apparatus for the separation and purification of multi-component mixtures by fractional crystallization.

Another object of the invention is to provide a process for the separation and purification of a hydrocarbon from a mixture containing other hydrocarbons.

A further object of the invention is to provide an improved process for the separation and purification of a component from a liquid multi-component mixture, said component forming waxy type crystals upon the cooling of the mixture.

A still further object of the invention is to provide a process which utilizes a displaced reflux liquid comprising crystal melt and a low boiling liquid solvent in order to remove occluded impurities from the crystals.

Yet another object of the invention is to provide a process wherein a low boiling liquid solvent is introduced into a crystal purification zone in order to lower the viscosity and density of the liquid phase and provide a synthetic reflux which aids the natural reflux in removing occluded impurities from the crystals.

Still other objects and advantages will become apparent to those skilled in the art from the following disclosure.

Broadly speaking, the present invention is directed to a process for separating a component from a liquid multi-component mixture according to its freezing point wherein a low boiling solvent is introduced into a melting zone maintained in a crystal purification zone at a temperature sufficiently high to melt at least a portion of the crystals therein. The resulting liquid comprising crystal melt and solvent is passed as a reflux stream through the crystal purification zone countercurrently to crystal movement therein in order to wash occluded impurities from the crystals formed by cooling the liquid multi-component mixture. By introducing the low boiling solvent into the purification zone, the viscosity and density of the liquid phase is lowered so that better contact between the reflux liquid and crystals is possible, thereby appreciably increasing the washing action of the reflux liquid. It is also within the scope of the present invention to introduce the solvent at a temperature sufficiently high to melt at least a portion of the crystals in the melting zone, thus permitting the elimination of a heat exchange means in the purification zone. A product, containing solvent, and in the form of melt or a mixture of melt and crystals, is recovered from the downstream end crystal-wise of the purification zone.

The process of this invention is applicable to a large number of simple binary and complex multi-component systems. The invention is particularly applicable to the separation and purification of materials which form soft waxy type crystals which are difficult to separate from the mother liquor. Examples of materials which form such crystals are the normal paraffins in admixture with other hydrocarbons and 2-methyl-5-vinyl pyridine in admixture with 2-methyl-5-ethyl pyridine. Another application of the present invention is in the dewaxing of petroleum oils where the separation of waxes therefrom by distillation is practically impossible because of the closeness of the boiling ranges of the waxes and oils. While the present invention is especially applicable to the purification of materials which form waxy type crystals, it is to be understood that the process can be used in effecting the separation and purification of other systems, including both organic and inorganic mixtures.

In carrying out the process of this invention, the solvent utilized should have a low viscosity, a low density, and a low freezing point and should be easily separable from the desired product. Any low boiling material which has these desirable properties can be utilized, but it is preferred to use as the solvent a low molecular weight hydrocarbon material such as propane, butane, pentane, hexane, or heptane, and compounds such as acetone, ether, sulfur dioxide, methyl amine, ammonia, and similar low boiling materials. Preferably the solvent is miscible in the liquid formed by melting crystals in the melting zone of the purification column, but it is within the scope of the invention to employ solvents which are only partly miscible or even immiscible in the crystal melt. It is also within the contemplation of the invention to use a liquid which is a selective solvent for the impurities present on the surface of the crystals and within the crystal interstices. Accordingly, in the separation of wax from waxy oils, it is preferred to use a liquid such as propane which is a solvent for the oil. In choosing a solvent, however, one should not be selected which will react with the material being separated.

It has been found that when utilizing a crystal purification column of the type described herein for separating and purifying materials which form soft waxy crystals, there may be a tendency for the crystals to agglomerate and stick in the column. The primary function of the solvent is to lower the viscosity and density of the crystal melt and thereby provide a more fluid system. The amount of solvent used and the temperature at which it is introduced will depend on the system and the particular type of equipment used. While large amounts of solvent are advantageous from the standpoint of density and viscosity, the solvent reduces the temperature required to obtain the same percentage of solids at equilibrium. In any particular system, therefore, there will be an optimum amount of solvent necessary to lower the viscosity and density of the crystal melt without materially reducing the temperature required to crystallize a high percentage of higher melting component crystals from the multi-component mixture. A further factor to be considered in determining the amount of solvent to use is the degree of purity desired. Generally, the amount of solvent utilized will vary from about 1 to about 25 percent of the volume of solids moving through the purification column. In providing a more fluid system, the solvent aids the natural reflux, i. e., that portion of the crystal melt displaced countercurrently to crystal flow, in washing mother liquor from the surface of the crystals and from the crystal interstices. By operating in this manner utilizing a low boiling solvent, a high purity product can be obtained even when effecting the separation and purification of materials which form waxy crystals.

For a more complete understanding of the invention, reference may be had to the drawing, in which:

Figure 1 is a diagrammatic elevation, partly in section, of an arrangement of apparatus suitable for carrying out the process of this invention; and Figure 2 is a diagrammatic elevation, partly in section, of another arrangement of apparatus of the invention.

Referring now to Figure 1 of the drawing, an upright elongated column 10 is provided with upper and lower closure members 11 and 12, respectively, and is divided into three principal sections, namely, a scraped surface chiller 13, a filter section 14, and a crystal purification column 16. Scraped surface chiller 13 comprises a tubular member 17 provided with refrigeration means such as an annular jacket 18 which is provided with refrigerant inlet line 19 and refrigerant outlet line 21, by means of which refrigerant is introduced into and withdrawn from the annular space between tubular member 17 and jacket 18. A shaft 22, centrally disposed within column 10, is supported by means of upper and lower bearings 23 and 24, respectively, and intermediate bearing 25. A plurality of scraper blades 26, attached to shaft 22 by a series of cross members 27, are positioned in close proximity to the walls of tubular member 17 and extend longitudinally throughout the length of that member.

Filter section 14, disposed immediately below scraped surface chiller 13 and connected thereto, comprises a filter screen 28, substantially cylindrical in shape, positioned within tube 29 which in turn is surrounded by jacket 31. The annular section between tube 29 and jacket 31 is divided into an upper and lower part by ring member 32. Tube 29 is perforated as by an upper row of holes 33 and a lower row of holes 34, the holes being spaced around the periphery of the tube near its bottom and top. By this arrangement of elements as described, filter section 14 is in effect divided into upper and lower filters 36 and 37, respectively. Line 38 provides means for withdrawing lower melting product or mother liquor from upper filter 36 while line 39 connects with lower filter 37 for withdrawal of the refluxing stream. A plurality of scraper blades 41 are attached to shaft 22 by arms 42 in close proximity to filter screen 28. Scraper blades 41 are of about the same height as filter screen 28 and provide means for preventing the clogging of the filter with crystals.

Crystals purification column 16 is connected to filter section 14 and comprises tubular member 43 closed at its lower end by closure member 12. A plurality of stirring means such as radial blades or rods 44 are attached to that portion of shaft 22 disposed within tubular member 43. A heat exchange means 45 is provided in column 16 in order to maintain a relatively high temperature at that end. As illustrated, the heat exchange means comprises a coil through which a heat transfer medium is circulated, but other means may be employed. For example, a coil can be disposed around column 16, an electrical heater can be positioned next to closure member 12, or an electrical bayonet type heater may be provided to extend into the purification column. While the heat exchange means is shown as being positioned in the lower end of the column, it is within the scope of the invention to locate the same in other portions of the column, e. g., an intermediate portion.

Shaft 22 extends through upper closure member 11 and is operatively connected to a motor 46. The rotation of shaft 22 rotates scraper blades 26, scraper blades 41, and stirrer rods 44 within scraped surface chiller 13, filter section 14, and crystal purification column 16, respectively.

Feed inlet line 47, communicating with the upper end of tubular member 17, contains a pump 48, and is connected to a source 49 of feed material. Line 51 connected to the lower end of column 16 provides means for introducing a low boiling solvent into that end of the column while line 52 containing valve 53 is attached to the lower end of the column for withdrawal of a controlled amount of higher melting product therefrom.

Referring to Figure 2 of the drawing, an elongated crystal purification column 56 is closed at its upper and lower ends by closure members 57 and 58, respectively. An impervious piston 59 disposed in the upper end of column 56 is connected by a connecting rod 61 to a hydraulic piston 62 in hydraulic cylinder 63. Lines 64 and 66 serve to pass hydraulic fluid alternately into and out of cylinder 63 so as to drive piston 62 which in turn causes the movement of piston 59. Filter section 67, disposed in an intermediate portion of column 56, comprises a filter screen 68, substantially cylindrical in shape, positioned next to the walls of the column. The walls of the column next to the filter screen are perforated as by holes 69 which in turn are surrounded by a jacket 71 having a liquid outlet line 72 connected thereto. A heat exchange means 73 is provided in the lower end of column 56 in order to maintain a relatively high temperature at that end. As illustrated, the heat exchange means comprises a coil through which a heat transfer medium is circulated. It is not intended to limit the invention to the specific heat exchange means shown, but other means may be employed as discussed supra. Line 74 connected to the end of column 56 provides means for introducing a low boiling solvent thereinto while line 76 containing valve 77 is for the withdrawal of a product from the column.

Chiller 78 is equipped with a reciprocating piston 79 which is operated in cylinder 81 by motor 82 through connecting rod 83 and piston rod 84 attached to eccentric 86. Lines 87 and 88 provide means for introducing a refrigerant into the annular space formed by jacket 89 and cylinder 81 and withdrawing the same therefrom. A feed line 91 connected to a source of feed material 92 communicates with interior of chamber 81 for introduction of feed material thereinto. Conduit 93 connects the delivery end of chiller 78 to filter 94 while conduit 96 connects the other end of the filter to crystal purification column 56. Line 97 provides means for withdrawing mother liquor from the crystal slurry introduced into filter 94 from chiller 78 through the operation of piston 79.

While the fractional crystallization apparatus of Figures 1 and 2 have been described with a certain degree of particularity, it is not intended to limit the instant invention to the particular apparatus described. Accordingly, it is within the scope of the invention to adapt other types of fractional crystallization apparatus for use in the process of this invention, e. g., those disclosed by D. L. McKay in copending U. S. application, Serial No. 375,850, filed August 24, 1953. Furthermore, while the crystal purification column of Figure 2 has been illustrated and for convenience described as occupying a substantially vertical position, it is to be understood that the purification column can be operated in other positions, e. g., a horizontal position. Still again, while the apparatus of Figure 2 is shown as utilizing a hydraulic piston, other types of crystal movers such as auger or helix can be utilized. It is also within the scope of the invention to use a porous piston, pervious to liquid but impervious to crystals, in which case a line is connected to the upper end of column 56 for withdrawal of mother liquor.

In the practice of the process of this invention utilizing the apparatus of Figure 1, a liquid feed mixture from source 49, which may be a liquid multi-component mixture containing components of different melting points, is introduced through line 47 into scraped surface chiller 13 under pressure developed by feed pump 48. Refrigerant is passed into the annular space between tubular member 17 and annular jacket 18 through line 19 and withdrawn therefrom through line 21 at a rate sufficient to maintain scraped surface chiller 13 at a temperature low enough to crystallize one of the components. The feed mixture fills the entire length of elongated column 10, and a superatmospheric pressure is maintained at the top of the column through the operation of pump 48. Because of the low chiller temperature, crystals of one component are frozen out, thus forming a slurry of crystals and mother liquor. Shaft 22 is slowly rotated by motor 46, thus causing scraper blades 26 to remove any crystals forming on the walls of tubular member 17. The slurry of mother liquor and crystals flows downwardly through chiller 13 and enters filter section 14 where the crystals are separated from mother liquor or lower melting product by passing the liquid through filter screen 28 and withdrawing the same from upper filter 36 through line 38. Filter scraper blades 41 slowly rotate with shaft 22 thereby preventing crystals from blocking the filter screen and ensuring free passage of liquid therethrough. The crystals together with occluded impurities then enter crystal purification column 16 displacing the liquid therein and forming a uniform, compact mass of crystals. Stirrer rods 44 slowly rotate with shaft 22 continuously stirring the crystals, thereby maintaining a uniform mass of crystals so that channeling of the displaced liquid is prevented. By circulating a heat transfer medium through coil 45, a melting zone is maintained within crystal purification column 16 at a temperature at least as high as the melting point of the crystals. The mass of crystals is moved downwardly through column 16 towards the melting zone by the combination of the force of gravity and the hydraulic force exerted by the liquid moving downwardly through column 10. On reaching the melting zone, at least a portion of the crystals are melted.

A low boiling solvent is introduced into the end of column 16 through line 51 thereby lowering the viscosity and density of the crystal melt. A product comprising melt or a mixture of melt and crystals and containing solvent is withdrawn through line 52 and thereafter passed to a distillation system, not shown, for removal of the solvent. A reflux stream comprising melted crystals and solvent is displaced upwardly through the downwardly moving mass of crystals and in intimate contact therewith through the combined effect of withdrawing only a portion of the liquid from the purification column and the liquid displacing action of the mass of crystals moving through the column. By introducing a solvent into the column and thereby lowering the viscosity and density of the liquid phase, the system is made more fluid and more efficient contact between the reflux stream and the moving mass of crystals is possible. By operating in this manner, the washing action of the reflux liquid in removing occluded impurities is more efficient, resulting in a product having a high degree of purity. The reflux stream separated from the crystal mass in lower filter section 37 is withdrawn through line 39 and can, if desired, be recycled to chiller 13 after removal of solvent therefrom.

In practicing the process of this invention in the apparatus of of Figure 2, a liquid feed mixture is introduced through line 91 into chiller 78. Refrigerant is passed into the annular space between cylinder 81 and jacket 89 through line 87 and withdrawn therefrom through line 88 at a rate sufficient to maintain chiller 78 at a temperature low enough to crystallize one of the components of the feed mixture. The crystal slurry formed within the chiller 78 is forced by piston 79, operatively connected to motor 82, from the chiller into filter 94, through conduit 93. In filter 94 mother liquor is separated from the crystal slurry and withdrawn therefrom through line 97. The crystals are thereafter forced through the continued operation of piston 79 out of filter 94 and into crystal purification column 56 through conduit 96. Piston 59 is moved downwardly by means of hydraulic piston 62 which is moved in response to fluid introduced into and withdrawn from hydraulic cylinder 63 through lines 64 and 66. Crystals on entering the crystal purification column through conduit 96 are forced downwardly through the column by means of piston 59. Repeated operation of piston 59 establishes and maintains a uniform, compact mass of crystals extending down the column into the upper portion of the melting zone maintained in the column by heat exchange means 73. On reaching the melting zone, at least a portion of the crystals are melted. A low boiling solvent is introduced into the end of the column through line 74 in order to lower the viscosity and density of the crystal melt. At least a portion of the resulting mixture comprising crystal melt and solvent is displaced upwardly as a reflux stream countercurrently to the downwardly moving mass of crystals. The reflux stream is removed from column 56 through filter section 67 by means of line 72 and can thereafter be recycled to chiller 78 after removal of solvent therefrom. A product in the form of melt or a mixture of melt and crystals and containing solvent is removed from the column through line 76 and passed to a distillation system, not shown, for removal of the solvent.

It will be evident that by utilizing a low boiling liquid solvent in carrying out my fractional crystallization process, I have provided a method which is especially adapted for the purification of materials which form soft waxy type crystals. By operating in this manner, the difficulty previously ecounetered in handling waxy crystals such as those formed by normal paraffins and 2-methyl-5-vinyl pyridine is overcome, and it is now possible to obtain a high purity product even when dealing with such materials.

As will be evident to those skilled in the art, various modification of this invention can be made or followed in the light of the foregoing disclosure and discussion without departing from the spirit or scope of the invention.

I claim:

1. A process for separating a component from a liquid multi-component mixture which comprises passing a compact mass of crystals, formed by said component by cooling said mixture, through a purification zone toward a melting zone; melting at least a portion of said crystals in said melting zone; introducing a solvent into said melting zone; passing at least a portion of the resulting mixture comprising melt and solvent countercurrently through said mass of crystals; and recovering a purified product from said melting zone.

2. A continuous process for separating a component from a liquid multi-component mixture which comprises passing a compact mass of crystals, formed by said component by cooling said mixture, through a purification zone toward a melting zone; continuously stirring said mass of crystals within said purification zone; melting at least a portion of said crystals in said melting zone; introducing a low boiling solvent into said melting zone; passing at least a portion of the resulting mixture comprising melt and solvent countercurrently through said mass of crystals; and removing a product containing solvent from said melting zone.

3. A continuous process for separating a component from a liquid multi-component mixture which comprises passing a slurry of mother liquor and crystals, formed by said component by cooling said mixture, into a scraped filter; removing mother liquor through said scraped filter; passing said crystals into a purification zone so as to form therein a compact mass of crystals; moving said mass of crystals through said purification zone toward a melting zone; melting at least a portion of said crystals in said melting zone; introducing a low boiling solvent into said melting zone; passing at least a portion of the resulting mixture comprising melt and solven countercurrently through said mass of crystals; and removing a product containing solvent from said melting zone.

4. A continuous process for separating a crystallizable component from a liquid multi-component mixture which comprises cooling said mixture so as to crystallize said component; separating crystals from lower melting components of said mixture; passing said crystals into a purification zone so as to form a compact mass of crystals therein; passing said mass of crystals through said purification zone; continuously stirring said mass of crystals within said purification zone; maintaining a melting zone in said purification zone at a temperature sufficiently high to melt at least a portion of said crystals; melting at least a portion of said crystals in said melting zone; introducing a low boiling solvent into said melting zone; passing at least a portion of the resulting mixture comprising melt and solvent countercurrently through said mass of crystals; and removing crystallizable material containing solvent from the downstream end crystalwise of said purification zone as product.

5. A continuous process for separating a component from a liquid multi-component mixture, said component forming crystals upon the cooling of said mixture, which comprises cooling said mixture to a temperature such as to form a slurry of said crystals and mother liquor; passing said slurry into a filter zone and withdrawing mother liquor therefrom; passing said crystals into a purification zone so as to form therein a compact mass of crystals; moving said mass of crystals through said purification zone; maintaining the downstream end of said purification zone with respect to crystal movement at a temperature sufficiently high to melt at least a portion of said crystals; melting at least a portion of said crystals in said downstream end of said purification zone; introducing a low boiling solvent into said downstream end of said purification zone; passing at least a portion of the resulting mixture comprising melt and solvent as a reflux stream countercurrently through said moving mass of crystals; removing said reflux stream from said filter zone; and recovering a product containing solvent from said downstream end of said purification zone.

6. The process of claim 5 in which said low boiling solvent is pentane.

7. The process of claim 5 in which said low boiling solvent is propane.

8. The process of claim 5 in which said low boiling solvent is hexane.

9. The process of claim 5 in which said low boiling solvent is heptane.

10. The process of claim 5 in which said low boiling solvent is methylamine.

11. The process of claim 5 in which said multi-component mixture comprises 2-methyl-5-vinyl pyridine and 2-methyl-5-ethyl pyridine.

12. A continuous process for separating a component from a liquid multi-component mixture, said component forming crystals upon the cooling of said mixture, which comprises cooling said mixture to a temperature such as to form a slurry of said crystals and mother liquor; separating said crystals from said slurry by passing mother liquor through a filter; passing said crystals into a purification zone so as to form a compact mass of crystals therein; moving said mass of crystals through said purification zone; introducing a low boiling solvent into the downstream end of said purification zone with respect to crystal movement at a temperature sufficiently high to melt at least a portion of said crystals; melting at least a portion of said crystals in said downstream end of said purification zone; passing a portion of the resulting mixture comprising melt and solvent as a reflux stream countercurrently through said moving mass of crystals so as to intimately contact said crystals; withdrawing said reflux stream containing solvent through said filter; and recovering a product containing solvent from said downstream end of said purification zone.

13. A continuous process for separating a component from a liquid multi-component mixture, said component forming crystals upon the cooling of said mixture, which comprises introducing said mixture into a cooling zone and cooling said mixture there in to a temperature such as to form a slurry of said crystals and mother liquor; separating said crystals from said slurry by passing mother liquor through a first filter; passing crystals into a purification zone so as to form therein a compact mass of crystals; moving said mass of crystals through said purification zone; maintaining the downstream end of said purification zone with respect to crystal movement at a temperature sufficiently high to melt at least a portion of said crystals; melting crystals in said downstream end of said purification zone; introducing a low boiling solvent into said downstream end; passing a portion of the resulting mixture comprising melt and solvent as a reflux stream countercurrently through said moving mass of crystals; withdrawing said reflux stream through a second filter; and recovering a product containing solvent from said downstream end of said purification zone.

14. A continuous process for separating a component from a liquid multi-component mixture, said component forming crystals upon the cooling of said mixture, which comprises introducing said mixture into a cooling zone and cooling said mixture therein to a temperature such as to form a slurry of crystals and mother liquor; flowing said slurry into a first filter zone and withdrawing mother liquor through a filter screen; continuously scraping said filter screen so as to permit free passage of mother liquor therethrough; passing said crystals into a purification zone so as to form therein a compact mass of crystals; gravitating said mass of crystals through said purification zone; continuously stirring said mass of crystals within said purification zone; maintaining the downstream end of said purification zone with respect to crystal movement at a temperature sufficiently high to melt at least a portion of said crystals; melting at least a portion of said crystals in said downstream end of said purification zone; introducing a low boiling solvent into said downstream end; passing a portion of the resulting mixture comprising melt and solvent as a reflux stream countercurrently through said gravitating mass of crystals; separating said reflux stream from said mass of crystals in a second filter zone by withdrawing said reflux stream through a filter screen; continuously scraping said last-mentioned filter screen so as to permit free passage of reflux liquid therethrough; and recovering a product containing solvent from said downstream end of said purification zone.

15. The process of claim 14 in which the temperature of the low boiling solvent introduced into said downstream end of said purification zone is such as to maintain said downstream end at a temperature sufficiently high to melt at least a portion of said crystals.

16. A process for the separation and purification of wax oil mixtures which comprises cooling a waxy oil in a cooling zone to a temperature such as to crystallize substantially all of the wax contained therein; passing the resulting slurry into a first filter zone and withdrawing a substantially wax-free oil therefrom; passing said wax crystals into a purification zone so as to form therein a compact mass of crystals; moving said mass of crystals through said purification zone; maintaining the downstream end of said purification zone with respect to crystal movement at a temperature sufficiently high to melt at least a portion of said wax crystals; melting at least a portion of the wax crystals in said downstream end of said purification zone; introducing a low boiling solvent into said downstream end of said purification zone; passing at least a portion of the resulting mixture comprising melted wax crystals and solvent as a reflux stream countercurrently through said moving mass of crystals; withdrawing said reflux stream from a second filter zone; and recovering wax-containing solvent from said downstream end of said purification zone.

17. The process of claim 16 in which said low boiling solvent is propane.

References Cited in the file of this patent
UNITED STATES PATENTS

| | | |
|---|---|---|
| 2,301,965 | Mauro et al. | Nov. 17, 1942 |
| 2,302,195 | Dons et al. | Nov. 17, 1942 |
| 2,540,083 | Arnold | Feb. 6, 1951 |
| 2,617,274 | Schmidt | Nov. 11, 1952 |
| 2,637,749 | Aston et al. | May 5, 1953 |